United States Patent Office 3,232,847
Patented Feb. 1, 1966

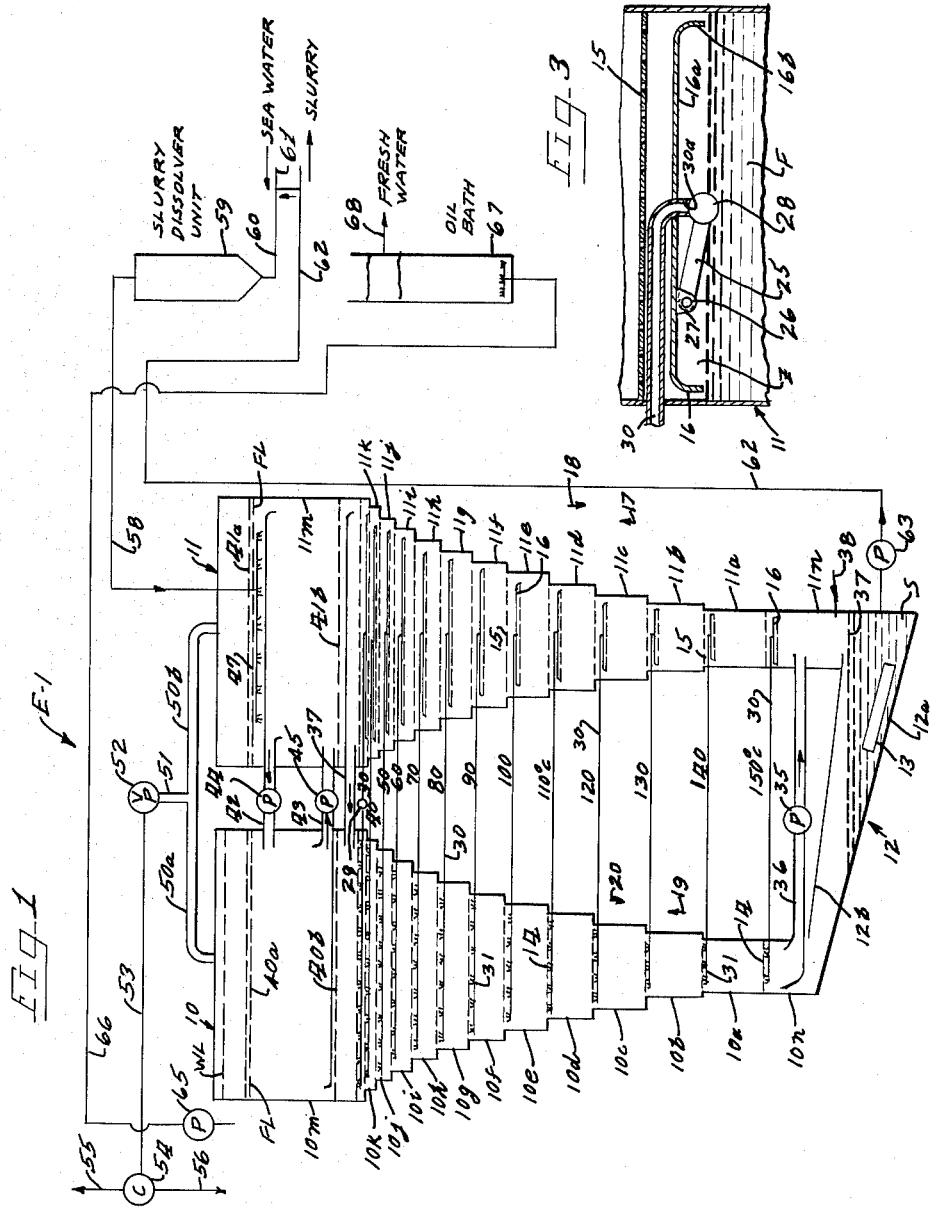

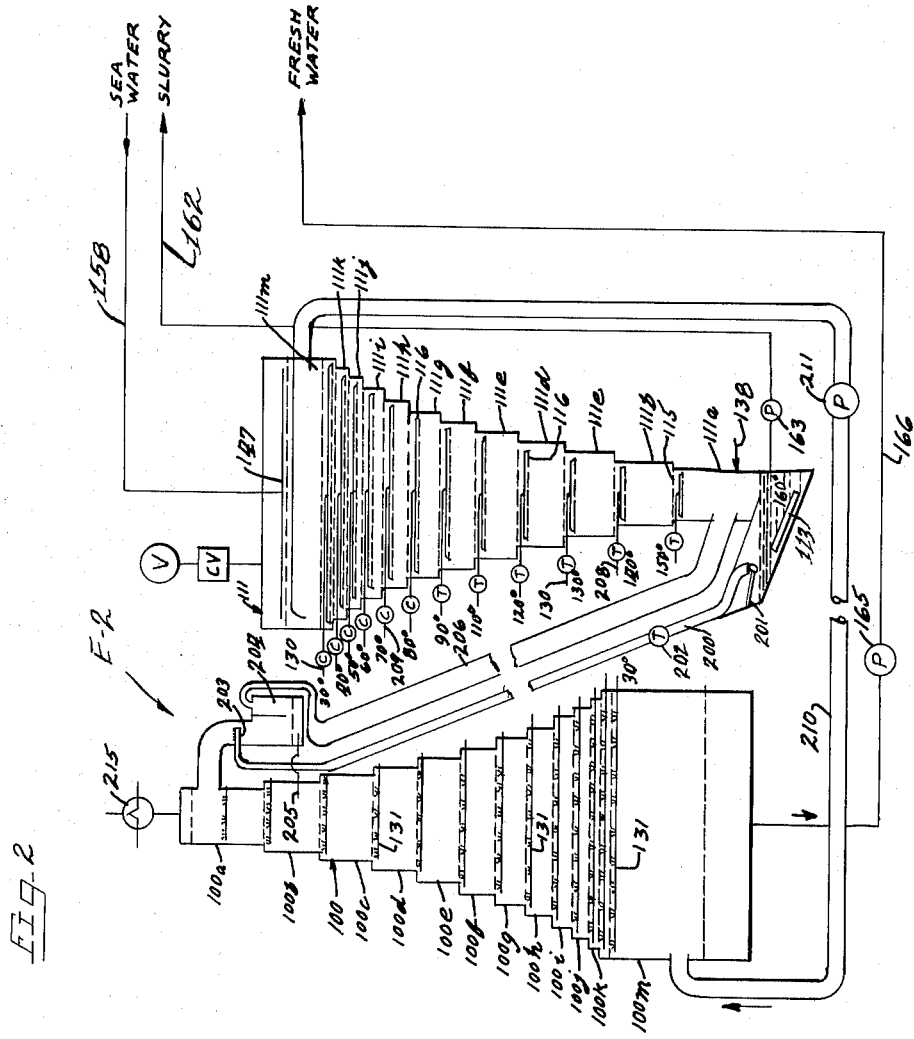

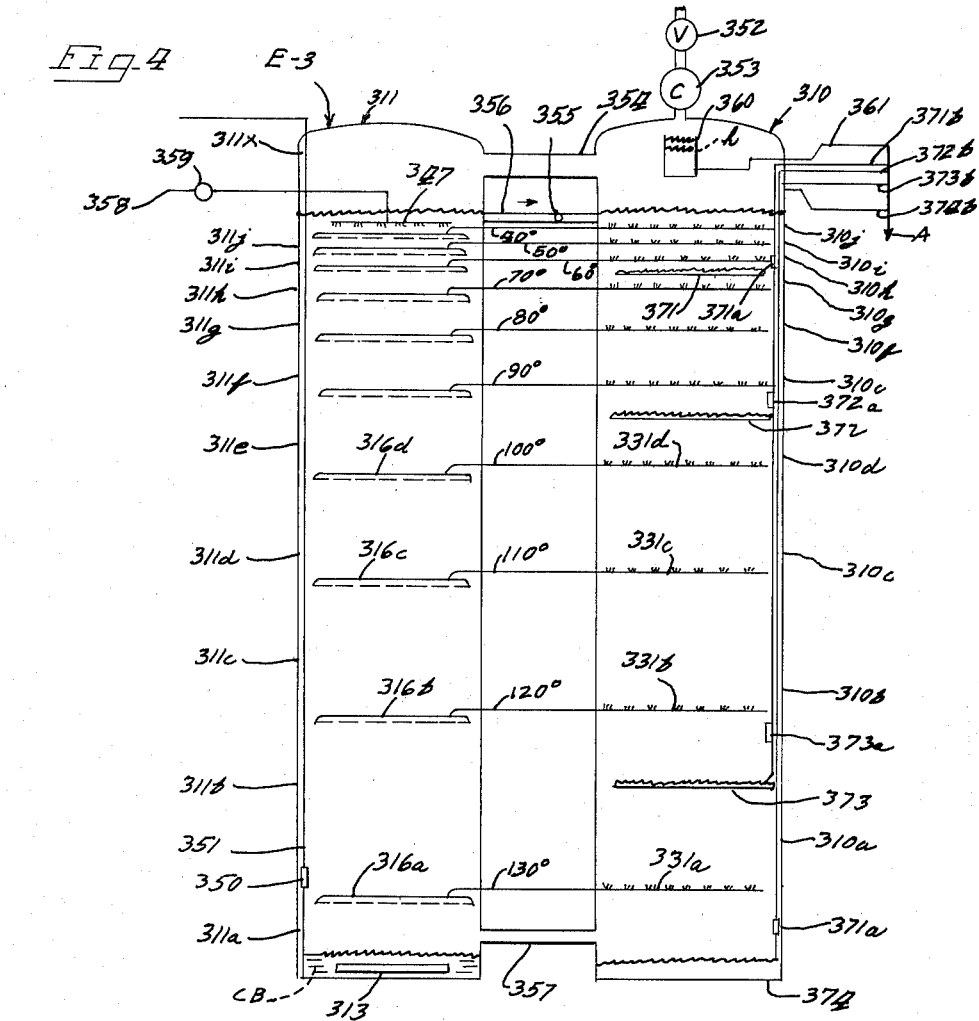
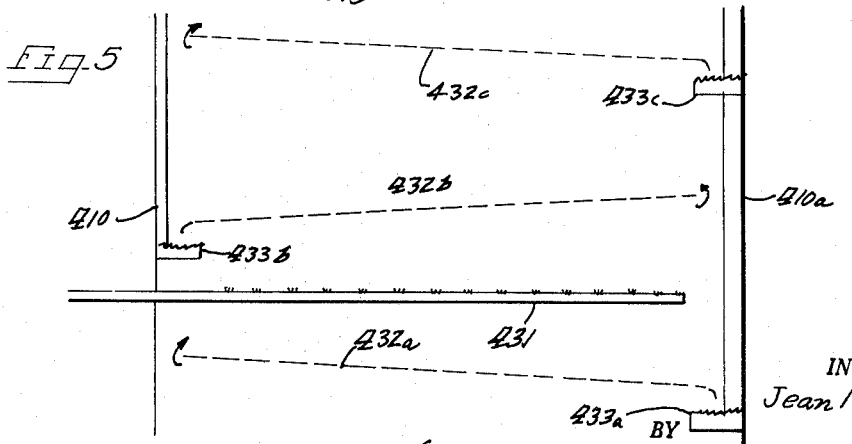

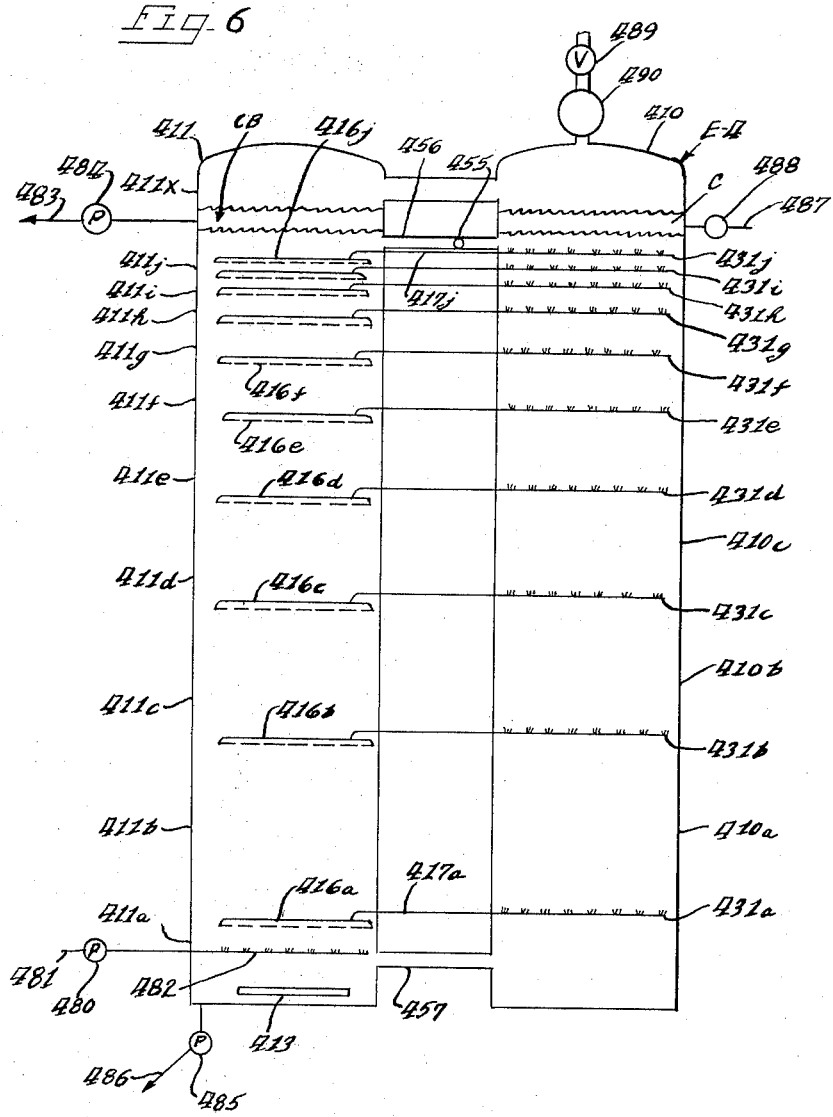

3,232,847
DISTILLATION PROCESS EMPLOYING DIRECT CONTACT HEATING AND CONDENSATION
Jean M. Hoff, Wyandotte, Mich., assignor to Hoff Chemical Corp., Flat Rock, Mich., a corporation of Delaware
Filed Sept. 11, 1961, Ser. No. 137,331
8 Claims. (Cl. 203—11)

The present invention relates broadly to the removal of a solute from a solvent-solute by a direct heat exchange technique, and is more particularly concerned with a multiple effect evaporation system utilizing hydrostatic pressure and its effect on solution boiling point in the vaporization and subsequent condensation of the solvent in direct contact with a heat exchanger liquid flowing in counter-current relation to the solvent-solute and the solvent condensate, respectively.

While the invention has numerous applications, it is productive of particularly satisfactory results as applied to saline water conversion and will accordingly be described herein in this connection. In accordance with the broader aspects of the invention, a liquid that is substantially insoluble in the solvent-solute liquid phase and in the solvent condensate is used as a direct contact heat exchange medium under countercurrent flow conditions in generally vertically arranged, well defined columns.

In accordance with the principles of this invention, maximum economy is realized in the utilization of heat for effecting the distillation of the solvent from the solute-solvent and in the recovery of the solvent as condensate, free or substantially free of the solute. This economy is facilitated by the use of a heat exchange liquid that is substantially insoluble in the liquid phase solute-solvent or the solvent itself. With such a heat exchange liquid, I have developed a multiple effect type of evaporator system wherein, in a continuous manner, and at different predetermined loci in the system, there is an efficient transfer of heat from the primary heat source to the heat exchange liquid and an efficient direct transfer of heat between the heat exchange liquid and the solute-solvent and the solvent, respectively, during the incremental vaporization, or distillation, of the solvent from the solute-solvent and the condensation of such incremental portions of the vaporized solvent. During such condensation at one such locus in the system, the heat released from the condensing solvent vapors is absorbed by the heat exchange liquid to increase the temperature of the latter, and such absorbed heat is subsequently utilized at a different locus in the system to effect the vaporization of the solvent from the solute-solvent. The system is maintained under preselected temperature and pressure conditions in predetermined well-defined zones (including such respective loci of vaporization and condensation) so as to utilize to a maximum extent, by direct transfer to the heat exchange liquid, the latent heat of volatilization of the solvent that is released upon condensation of each increment of vaporized solvent.

In its preferred embodiment, the system comprises two substantially vertical columns with a lower connecting zone for the collection of the solute in the form of a concentrated solution or slurry. The primary heat source is located in said lower zone, preferably in direct contact with the concentrated solute that collects therein, and this primary heat source serves to raise the temperature of the surrounding liquid mass to its boiling point under the hydrostatic pressure there obtaining. The heat transfer liquid, when the system is operating, fills the system to a predetermined level near the tops of the respective columns. By means of forced circulation, the heat exchange liquid is caused to flow downwardly in one column, through a lower path communicating between the columns separate from and just above said lower connecting zone, upwardly in the second column and back to near the top of the first column through an upper path communicating between the columns. The solute-solvent to be freed of its solute content is introduced into the upper portion of the second column into direct heat transfer relationship with the heat exchange liquid. As the solute-solvent flows by gravity down through the heat exchange liquid rising in the second column, its solvent content is incrementally vaporized in zones of progressively higher pressure (equivalent to the total of the absolute pressure in the gas space above the level of liquid in the system and of the hydrostatic head of such liquid) and of correspondingly higher temperatures. The increments of vaporized solvent are drawn off from a multiplicity of vapor collection zones in the second column to corresponding condensation zones in the first column. There, under the maintenance of the proper conditions of temperature and pressure, the heat released from the condensing solvent vapor is directly transferred to the downwardly flowing heat transfer liquid, while the condensed solvent, because of its lesser density than the heat transfer liquid with which it is in contact, rises toward the top of the first column above the level of the heat transfer fluid therein. From the layer of solvent condensate there formed, the condensed solvent is withdrawn for recovery in a condition substantially free from solute. In the case of saline water conversion, the recovered condensate is water of sufficiently low salt content to be usable as fresh water.

The entire system just described is preferably maintained under a reduced gas pressure by conventional vacuum creating means in communication with the gas spaces in the upper portions of the two columns. Preferably, a substantial degree of vacuum, in the order of 1 p.s.i.a. (one pound per square inch absolute pressure) is maintained in said gas spaces. By proper selection of the degree of vacuum to be maintained in said gas spaces and of the particular heat exchange liquid to be used with a given solute-solvent, zones for the incremental vaporization and condensation of the solvent in the respective columns can be located and maintained under such conditions of temperature and pressure as to carry out the process of my invention economically and to the best advantage on a continuously operating basis.

It is therefore an important aim of the present invention to provide a solute separation method and apparatus featuring multiple effect evaporation and the utilization of the effect of hydrostatic pressure on the boiling point of a solution to permit repeated re-use of the heat released by condensation of the solvent.

Another object of this invention lies in the provision of a method of separating a solute from its solvent wherein a heat exchange liquid which is substantially insoluble in the solvent is caused to flow upwardly in one column counter-current to the flow of the solvent-solute, vaporizing the solvent at successively lower temperatures and pressures as the heat exchange liquid flows upwardly, and in a separate but connected column is caused to flow downwardly while condensing the vaporized solvent in successive stages with consequent increase in the temperature of the heat exchange fluid.

Still another object of the present invention is to provide a separation method of the foregoing character, wherein the heat exchange liquid has a density intermediate that of the incoming solvent-solute and the solvent itself.

Still another object of this invention lies in the provision of a hydrostatic multiple effect evaporator constructed to provide intermingled counter-current flow in one portion thereof between a flowing body of solvent-solute and a flowing stream of heat exchange liquid, and in another portion thereof interminged counter-current flow between the heat exchange liquid and the solvent after being vaporized and condensed.

A further object of the instant invention is to provide a method of separating a solute from a solute-solvent, in which in one column the latter and a heat exchange liquid substantially insoluble in the solvent are passed in contacting counter flow relation and the solvent vaporized in zones of successively decreasing temperatures and pressures, while in another column the temperature of the heat exchange liquid is raised by absorption of the heat released by condensation of the vaporized solvent, and the resulting condensed solvent then collected.

An even further object of this invention is to provide apparatus for separating a solute from a solute-solvent, which includes a substantially vertically arranged heat exchanger, means in the heat exchanger dividing the same into a plurality of communicating substantially vertical columns of successively decreasing temperatures and pressures from the lower to the upper levels thereof, means feeding the solute-solvent into the upper end of one of the columns of the heat exchanger for downward movement therein, means directing a heat exchange liquid which is substantially insoluble in the solvent downwardly in the other of said columns for upward flow in said one column, means for heating said liquid, including a primary source of heat in a lower zone of said heat exchanger, to raise the temperature of the heat exchange liquid to the boiling point of the solvent, whereby said solvent is vaporized in said one column, and means for transferring the resulting vapors into said other column for condensation therein and movement of the condensate upwardly through successively decreasing temperature and pressure zones in heat exchange relation with the heat exchange liquid.

Other objects and advantages of the invention will become more apparent during the course of the following description, particularly when taken in conjunction with the accompanying drawings.

In the drawings, wherein like numerals designate like parts throughout the same:

FIGURES 1, 2, 4 and 6 are more or less diagrammatic views of illustrative forms of hydrostatic multiple effect evaporators constructed in accordance with the principles of this invention;

FIGURE 3 is a detail sectional view of a steam collection hood which may be utilized in the arrangements of FIGURES 1 and 2; and FIGURE 5 is a view comparable to FIGURE 3 but showing a detail view of the arrangement of FIGURE 4.

Referring now to FIGURE 1, there is shown a hydrostatic multiple effect evaporator generally designated by the legend E–1 and illustrated in association with other apparatus to provide a complete system for separating a solute from its solvent. In the exemplary system of FIGURE 1, the evaporator E–1 is employed for saline water conversion, and, as thus utilized, salt is removed from sea water to provide fresh water for human consumption and other uses. However, as has been stated, the method and apparatus of this invention are not limited to salt water conversion, but may be used to separate various solutes from solution in their solvents by utilization of the effect of hydrostatic pressure on the boiling point of a solvent in a novel manner which permits repeated re-use of the heat released by condensation of the solvent for raising the temperature of the heat exchange liquid.

The multiple effect evaporator E–1 of FIGURE 1 comprises a pair of communicating and essentially identical heat exchange columns 10 and 11 which may be comprised of a plurality of structually integrated cylindrical members 10a–k and 10m and 11a–k and 11m calculated as to their relative diameters and heights to have substantially the same volumetric capacities in order to provide interiorly in the zones defined thereby essentially the same reaction or holdup times. The heat exchange columns 10 and 11 of course could be constructed differently and may be of inverted conical configuration, although for ease of construction stacked cylinders of upwardly increasing diameter as shown are presently preferred. The heat exchange columns 10 and 11 are connected at their lower ends by provision of cylindrical sections 10n and 11n structurally united by a bottom section 12 formed with a sloping wall segment 12a and containing therewithin a pool of boiling salt slurry or concentrated solution S maintained at its boiling point by primary heating means 13 shown diagrammatically. The heating means may take various forms, and may be a resistance heater, a fuel and air fed submerged combustion unit and the like. If a submerged combustion unit is used, it may be found desirable to provide a vent for the combustion gases, located for example in communication with the cylindrical member 10f.

The heat exchange fluid used in the present invention is substantially insoluble in the solvent (water), and should have the further characteristics of rapid and complete disengagement of any emulsion formed, high heat capacity, low vapor pressure, low viscosity, no odor or taste, no toxicity and low cost. Illustrative materials meeting all or many of these requirements as as follows:

*Exemplary heat exchange fluids*

|  | M.P., °C. | B.P., °C. | Sp. Gr. (20° C.) |
|---|---|---|---|
| Acetylene tetrachloride | −44 | 146 | 1.5866 |
| Benzene sulfone chloride | 14.5 | 247 | 1.3830 |
| Benzyl benzoate | 18.3 | 323 | 1.1200 |
| Benzyl chloride | −39 | 179 | 1.1026 |
| Benzyl formate | 3.6 | 298 | 1.0810 |
| Butyl tartrate | 22.5 | 203 | 1.0980 |
| Chlor aniline (o) | 0 | 210 | 1.2125 |
| Chlor aniline (m) | −10.4 | 230 | 1.2156 |
| Chloro toluene (o) | −36.5 | 159 | 1.0776 |
| Chloro toluene (m) | −47.8 | 162 | 1.0722 |
| Chloro toluene (p) | 7.8 | 162 | 1.0705 |
| Dibenzyl amine | −25.6 | 300 | 1.0357 |
| Epichlorohydrine | −25.6 | 117 | 1.2031 |
| Ethylchloroacetate | −26.0 | 143 | 1.1585 |
| Ethylnaphthyl ether | 5.5 | 276 | 1.0543 |
| Methyl adipate | .8 | 110 | 1.0626 |
| Methyl succinate | 19.5 | 196 | 1.1149 |
| Safrol (1,3,4) | 11 | 236 | 1.0960 |
| Tetrachlor Ethylene | −22.4 | 121 | 1.6080 |
| Dichloropentane mix | −50.0 | 178 | 1.06–1.09 |
| Hexachlorobutadiene | −20 | 215 | 1.675 |

It is preferred, however, that the heat exchange fluid have a density effectively different from that of the solvent and the solvent-solute in order to maintain a balanced hydrostatic head and to obtain good solvent vapor absorption, since in the instant process the vapors travel toward reduced temperature zones. At present the preferred heat exchange liquid is a distilled dichloropentane mix, either by itself or blended with heavy hydrocarbons or heavier chlorinated hydrocarbons, or both. Commercially available mixes of distilled dichloropentane have specific gravities varying between 1.06 and 1.09. On the other hand, dichlorohexane and higher hydrocarbons may also be found quite satisfactory, and tetrachloroethane, while having a density of 1.5866, can be blended with hydrocarbons for use in the present process. Tetrachloroethane has a specific heat of 0.268 cal./gm./deg. at 20° C., as compared to a specific heat of about 0.44 for known dichloropentane mixes. Tetrachloroethane has a boiling point of about 146° C., and in the table appearing above it was noted that dichloropentane mixes boil at about 178°. Still another preferred heat exchange liquid is a heavy naphtha mixed with enough terachloroethylene or hexachlorobutadiene to raise the gravity to the desired level. In any event, the heat exchange fluid and water must have density differences over the entire temperature range present in the heat exchange columns 10 and 11 in order to effect the separation. This is readily accomplished by the use of dichloropentane from which the light ends may be stripped out or by adding tetrachloroethane to provide a starting specific gravity of 1.1.

Referring now again to FIGURE 1, the heat exchange columns 10 and 11 may be seen to be of approximately the same effective diameters, and in order to provide a balanced hydrostatic head and to reduce the pumping requirements, the columns should also be of the same height. The total height of the columns 10 and 11, as measured from the upper level of the boiling pool S to the top of the uppermost cylindrical members 10m and 11m, does depend, however, upon the specific gravity of the heat exchange fluid. In other words, and assuming a twelve stage separation or extraction system as indicated in FIGURE 1, the depth of heat exchange liquid required to provide a particular absolute pressure so that the solvent-solute or sea water boils at the temperatures shown in FIGURE 1 is controlled by the density of the heat exchange fluid. This may be more fully understood from the table below, indicating the number of feet of approximate 1.1 specific gravity liquid below perfect vacuum required to provide the pressures shown at the water boiling point temperatures indicated.

*Hydrostatic head requirements at various water boiling points and pressures*

| Water B.P. °C. | Absolute Pressure p.s.i. | Feet of 1.1 Sp. gr. Liquid Below Perfect Vacuum to Give This Pressure |
|---|---|---|
| 40 | 1.0661 | 2.23 |
| 50 | 1.7849 | 3.99 |
| 60 | 2.885 | 6.05 |
| 70 | 4.516 | 9.47 |
| 80 | 6.867 | 14.4 |
| 90 | 10.167 | 21.3 |
| 100 | 14.697 | 30.8 |
| 110 | 20.777 | 43.5 |
| 120 | 28.792 | 60.4 |
| 130 | 39.17 | 82.1 |
| 140 | 52.39 | 109.6 |
| 150 | 69.01 | 144.6 |
| 160 | 89.59 | 187.5 |

In the above table, the figures in the column to the right were obtained by dividing the figures in the center column by 0.477, which is approximately the pressure applied by one foot of 1.1 specific gravity liquid. As may now be seen, at a given temperature less depth is required to keep the salt solution from boiling by about one stage, and in the exemplary embodiment of FIGURE 1 it may further be seen that the columns 10 and 11 from the top of the pool S to the top of the cylindrical members 10m and 11m would be about 150 feet.

It is further pertinent to note in this connection that as the solvent-solute flows downwardly in the heat exchange column 11 in counter flow relation with the heat exchange fluid, as will be more specifically described hereinafter, the solvent-solute boils at between 6 and 10° C. higher than the boiling points of water indicated in the lefthand column of the above table. This is very advantageous since once a drop of water has been freed from the salt solution as steam in the lowermost region of the column 11, it must travel upwardly a distance of approximately thirty feet in the column 10 before reaching a zone whereat it can condense. This facilitates keeping water droplets out of the water-heat exchange liquid separator where the apparently most difficult separation has to be made.

In FIGURE 1 it will be observed that interiorly of each heat exchange column 10 and 11 is a plurality of vertically spaced and generally parallel perforated plates or baffles, the baffles in the column 10 being identified by the numeral 14 and the baffles in the column 11 by the numeral 15. These baffles divide each column into a plurality of reaction zones having generally the temperatures indicated and conforming substantially to the temperatures at which water boils under the pressure conditions set forth in the table above. The baffles or plates 14 and 15 are effective to break up convection currents, and assuming that the perforations or holes in the baffles are of relatively small diameters, the plate 15 in the column 11 functions to collect a pool of sea water or brine thereabove, while the baffles 14 in the column 10 serve to collect water therebelow, assuring a more positive separation.

Mounted in any suitable manner in closely spaced relation to each baffle 15 in the column 11 and immediately beneath each baffle is a steam collecting hood 16. The hoods are spaced relative to one another in accordance with a plot of the boiling point of water and absolute pressure as shown in the lefthand and the center column of the table last set forth above. In other words, if a graph is prepared with temperature on the abscissa and absolute pressure on the ordinate, a plotting of the temperatures and pressures from the above table reveals a spacing between the points plotted. This spacing is that used between the steam collection hoods 16, with the hoods in the upper regions of the column 11 and in the reduced temperature zones being located relatively more closely one to the other.

The steam collection hoods 16 may be generally circular when viewed in plan, assuming the sections 11a–k are cylindrical in configuration, although of course the shapes can be widely varied. In any event, the hoods 16 are sized relative to the sections 11a–k of the heat exchange column 11 so as to provide radially outwardly of the hoods counter-current flow paths for the solvent-solute (sea water) and the heat exchange fluid. As was stated earlier, in the embodiment of FIGURE 1, the heat exchange fluid flows upwardly, as indicated by the arrow to which the numeral 17 has been applied, while the solvent-solute flows downwardly as indicated by the arrow to which the numeral 18 has been affixed. In the other heat exchange column 10, on the other hand, the water droplets flow upwardly as shown by the arrow marked 19, while the heat exchange liquid moves downwardly, as identified by the arrow to which the numeral 20 has been attached. As will be later noted, however, upward flow of the water droplets and downward flow of the heat exchange liquid is not at all times necessary, and a reverse type flow could be used if a heat exchange liquid having a density lower than that of the solvent or water was used.

An exemplary form of steam collection hood 16 and vent means therefor is shown in FIGURE 3, and it may be seen therefrom that each hood 16 has a generally flat roof portion 16a and an integral dependent annular flange 16b formed thereon, which with the roof portion 16a defines a steam collection zone Z within the upwardly moving heat exchange liquid and in each reaction zone defined by the vertically spaced perforated baffles 15. The steam collection zone Z becomes essentially free of heat exchange liquid F as steam builds up in the zone Z as a result of vaporization of the solvent by the heat exchange fluid at that temperature necessary to boil the solvent at a particular value of absolute pressure, in the reaction zones of decreasing temperatures and pressures as the heat exchange liquid moves upwardly in the heat exchange column 11.

To vent the steam under particular pressure conditions, a valving arrangement of the character shown in FIGURE 3 may be employed. Such means may include a plate member 25 pivotally connected at 26 by suitable bracket means 27 mounted from the hood roof portion 16a, the plate member 25 supporting a ball member 28 movable by swinging action of the plate member 25 into opening and closing relation with respect to a mouth portion 30a of conduit means 30. As appears in FIGURE 1, a plurality of such conduit means 30 are provided serving each of the steam collection hoods 16 and venting steam from each of the successively reducing temperature and pressure reaction zones. Of course, and as is believed now quite apparent, as the steam builds up within a steam collection zone Z, the plate or damper member pivots downwardly to remove the ball valve 28 from the conduit mouth portion 30a, permitting the steam to be ported through the conduit means 30. The hollow ball 28 floats on the steam-liquid interface, as shown, and is used as both a float and a shut-off.

The steam collecting hoods 16 can of course be constructed differently than is shown in FIGURE 3. As for example, each hood may be formed to include, when viewed in top plan, a series of connected inverted troughs which permit the solvent-solute to pass through, and thereby avoid channeling of the brine to the periphery of the hoods and the formation of concentrated brine zones in this location.

Each conduit member 30 connects at its opposite end with steam discharge means 31, shown somewhat diagrammatically, and taking the form of a sparger of either straight or ring-like configuration when viewed in plan. In this connection, it should be noted that it is very desirable that the steam being discharged in the heat exchange column 10 be well distributed in each stage provided therein, and as much steam as possible should be condensed by contact with the downwardly flowing heat exchange liquid before the condensed steam reaches the stage above. If the steam vapors are not condensed in a lower stage, they would move to a higher stage, increasing the temperature of that stage, and creating the possibility that one or more of the upper stages would be at a sufficiently high temperature so that steam moving therein would not be condensed. It is accordingly for these reasons that the steam discharge means 31 are sized and shaped so as to provide effective steam distribution in the heat exchange column 10.

Continuous circulation of the heat exchange fluid F is desirable for effective heat exchange, and for this purpose pump means 35, indicated more or less diagrammatically is provided in a connector 36 communicating with the lower ends of the heat exchange columns 10 and 11 through the cylindrical members 10n and 11n thereof. As also appears in FIGURE 1, the heat exchange columns 10 and 11, and particularly the cylindrical members 10m and 11m communicate through the connector member 37 to provide continuous circulation of the heat exchange fluid throughout the system. Further, by the pump means 35 there is overcome the natural tendency of the heat exchange fluid to flow upwardly in the column 10 and downwardly in the column 11. Of course, the connector member 37 could also be equipped with pump means, and it may be found desirable to additionally connect the heat exchange columns 10 and 11 at locations between the opposite ends thereof and to utilize additional pump means.

It was earlier noted that the heat exchange columns 10 and 11 are connected at their lower ends by a bottom wall section 12a, and it is to be further seen that a wall member 12b also provides connection between the columns. Thus, between the wall portions 12a and 12b there is provided a tank for the boiling salt solution, an entry to which is provided by space or opening 37 between one end of the wall member 12 and the wall structure providing the lower end of the column 11. The opening 37 is held to a minimum dimension to admit slurry while at the same time permitting the wall portion 12b to divert substantially all steam evolved to the column 10. As also appears at this location, heat exchange liquid for the initial supply or for replenishment purposes can be admitted to the heat exchange column 11 by conduit means, shown diagrammatically and indicated at 38. If desired, the heat exchange liquid supply conduit 38 may connect with external heating means to raise the temperature of the liquid to the desired level, although normally the heat absorbed by condensation of the solvent in the column 10 is sufficient for this purpose. Of course, additional heat is absorbed by a portion of the fluid contacting the boiling slurry S, although the major amount of the fluid flowing at this location is heated by the water being vaporized from the boiling salt solution.

The upper ends of the heat exchange columns 10 and 11 are provided by the cylindrical members 10m and 11m, respectively, and interiorly thereof there is provided a pair of vertically spaced perforated partition or baffle members 40a-b and 41a-b. The upper cylindrical sections 10m and 11m are in communication with one another through conduit means 42 and 43, and the conduit means may be provided with pump means 44 and 45. The perforated partition or baffle members 40a-b and 41a-b, together with the side wall structure of the upper cylindrical members 10m and 11m define a secondary or auxiliary zone for circulation of the heat exchange fluid, for the important purpose of preheating the solvent-solute which is fed into the upper cylindrical member 11m between the perforated baffles 41a and 41b by means of a feed sparger 47. The temperature of the heat exchange liquid in the secondary circulation zone thus provided is only that needed for preheating purposes so that as the solvent-solute enters the primary heat exchange circulation zone in the column 11, vaporization occurs almost immediately. Since there is no vaporization within the uppermost cylindrical members 10m and 11m, the volume of heat exchange fluid required to circulate per second is only about twice the weight of the water flowing upwardly in the heat exchange column 10. Of course, the secondary circulation zone for the heat exchange fluid could be eliminated and an external heat exchanger utilized.

As a further feature of this invention, the upper portion of each heat exchange column 10 and 11 is desirably maintained under vacuum of the order of about one p.s.i. absolute, thereby permitting a greater number of stages to be used than would be possible if reliance were placed solely upon the hydrostatic head. A suitable arrangement for this purpose may comprise a pair of branch conduits 50a and 50b communicating with the interiors of the top cylindrical members 10m and 11m and connected to a main conduit 51 leading to a vacuum pump 52. The vacuum pump 52 in turn has connected thereto a conduit 53 terminating in a condenser 54 having a vent line 55 porting the gaseous product and a line 56 discharging water and heat exchange fluid, which can be returned to the multiple effect evaporator E-1 in any suitable manner.

In this connection it may be seen that the heat exchange liquid level is maintained in the columns 10 and 11 at approximately the level indicated at FL, while the condensed water product is at about the level WL. There is a minimum of condensable vapors in the upper cylindrical members 10m and 11m, the amount of said vapors being maintained as low as possible to avoid imposing a burden on the vacuum system. As will now be appreciated, the vapors present are the result of the vacuum drawing dissolved air out of the sea water and vaporization of some of the heat exchangeable fluid, even though the fluid is far below its boiling point.

The solvent-solute is directed to the sparger 47 by means of a conduit 58 connected to slurry dissolving means 59. The latter means has a connection thereto numbered 60 receiving sea water from a source line 61, and if desired, slurry or concentrated solvent from a line 62 which makes a junction with the line 61 and terminates at its opposite end in the pool of boiling salt solution. As appears, the line 62 is provided with pump means 63.

It was earlier noted that preferably, although not necessarily, the heat exchange liquid F have a specific gravity between that of the incoming feed (solvent-solute) and fresh water. Since, generally speaking, sea water has a specific gravity of about 1.025 and the presently preferred distilled dichloropentane mix has a density of about 1.07, the sea water should desirably be concentrated with slurry to a specific gravity of about 1.2. This can readily be accomplished by the recirculation system shown, providing in the total system relatively wider working limits, and reducing the entrainment and size of the separating zones required. In addition, recycling has the advantage of removing sludge or other deleterious materials which could form scale in the bottom of the evaporator unit E–1. The relative amounts of slurry and sea water employed to give a 1.2 specific gravity for the feed can readily be controlled, and in this regard the volume of slurry recycled should be maintained relatively low in order to reduce heat losses. As well, instead of a single slurry supply line 62, a number of relatively smaller diameter lines could be used to provide better heat transfer.

The water droplets which rise in the downwardly flowing heat exchange fluid in the column 10, and through the perforated baffles 14, 40a and 40b, are withdrawn from this column at the extreme upper end thereof under action of pump means 65 located in a solvent discharge conduit 66 leading to a wash unit 67. The unit 67 may be a conventional oil bath in which the product water is washed to recover any chlorinated solvent. The oil used may be either a lighter than water or heavier than water petroleum distillate, which can later be used to provide makeup liquid in the evaporator unit E–1. From the unit 67, the product water is removed through conduit means 68 for normal uses.

In the operation of the hydrostatic multiple effect evaporator E–1 of FIGURE 1, the evaporator is initially charged with a calculated volume of heat exchange liquid sufficient to furnish to the solvent water the latent heat of vaporization thereof in each of the twelve stages shown. A material balance for the system will be later set forth, however, the evaporator E–1 may be initially charged and the heat exchange fluid replenished by the connection 38. The feed is admitted to the upper portion of the heat exchange column 11 by the sparger 47, and the salt solution during its downward flow is evaporated by the upwardly flowing heat exchange fluid. The fluid is itself heated in the column 10 by the heat released by condensation of the steam and by contacting the boiling salt solution in the lower end of the columns 10 and 11. Thus, at a predetermined flow of heat exchange liquid, condensing a certain amount of solvent per second in the heat exchange fluid in the column 10 increases the temperature of the heat exchange liquid by "$x$" degrees, or as is indicated in the exemplary embodiment of FIGURE 1, by approximately 10°. As the heated heat exchange fluid flows upwardly in the column 11, warming the downwardly flowing solvent-solute, each time the heat exchange liquid is cooled "$x$" degrees by the downwardly flowing feed, the heat exchange fluid vaporizes said certain amount of solvent again, neglecting the fact that specific heat of the heat exchange fluid decreases slightly at lower temperatures. In this connection, since the heat transfer fluids have a higher specific heat at the higher temperature where heat is taken up than they do at the relatively cooler upper end of the heat exchange column 11, and with a constant temperature drop between the stages from bottom to top of the column 11, the upper steam collection hoods 16 will collect in order of approximately 20% less steam than the hoods in the lower and relatively higher temperature portion of the heat exchange column 11.

The increments of vaporized solvent produced in the heat exchange column 11 are collected or trapped by the hoods 16 and are directed through the conduit means 30 and steam discharge means 31 and into contact with the heat exchange fluid in the column 10 wherein it is condensed. In this column, the heat exchange fluid is flowing downwardly through successively increasing temperature and pressure zones, and the relatively high temperature vapors are applied to the flowing heat exchange fluid after the fluid has been warmed by relatively lower temperature vapors in the zone immediately above. The condensed vapors having a lower density than the heat exchange fluid, then flow upwardly in the column 10 and are removed from the top thereof under action of the pump means 65 and are directed to the oil wash unit 67.

As is known, each gram of water has a heat of evaporation of about 540 calories, and with a 10° temperature change for the heat exchange liquid and most liquids suitable for this purpose having a specific heat of about 0.5 cal./gm./° C., 108 grams of heat exchange liquid must be circulating in the heat exchange columns 10 and 11 for each gram of water evaporated per second from the solvent-solute. Similar amounts of water are being evaporated from the other 10° stages, and the same 108 grams of heat exchange fluid satisfies the heat requirements at each stage since the oil goes through the same temperature change. FIGURE 1 has been described as providing twelve 10° temperature differential stages, however, this number can be widely varied. As for example, twenty-four stages may be employed with a 5° differential between stages. This would require that twice the indicated volume of oil be circulated per second, although since the heat exchange columns are balanced, circulating relatively large volumes of heat exchange fluids presents no great difficulties.

To describe the material balance for the system of FIGURE 1, 108 grams of heat exchange liquid are circulated through the heat exchange columns 10 and 11 to furnish the heat of vaporization required to evaporate each gram of water. In addition, approximately 23.4 grams of heat exchange liquid are circulated for the purpose of preheating the feed discharge from the sparger 47. There is thus 23.4 grams of heat exchange liquid flowing per second through the conduit means 42 and 43 connecting the uppermost cylindrical members 10$m$ and 11$m$, which with the baffle members 40$a$–$b$ and 41$a$–$b$, define the auxiliary circulation zone for heat exchange fluid. As well, 108 plus 23.4 grams of heat exchange fluid circulate per second upwardly in the heat exchange column 11, through the conduit means 37, downwardly through the heat exchange column 10 and through the conduit means 36 and lower ends of the columns 10 and 11, for each gram of water evaporated per second.

Under these conditions, and assuming an input of 16 grams per second of solvent-solute, made up of 12.8 grams of water and 3.2 grams of salt, 1 gram per second of water is vaporized in the first stage defined by the cylindrical members 10$a$ and 11$a$ and this quantity successively decreases until approximately 0.8 grams per second of water is evaporated in the twelfth and final stage defined by the cylindrical members 10$k$ and 11$k$. As was stated earlier, this difference of approximately 20% in the amount of water evaporated is due to the fact that the heat transfer fluid has a higher specific heat at the higher temperatures encountered in the lower end of the evaporator E–1. Of course, in general the vertical midpoint of the heat exchange columns 10 and 11, as in the reaction zones defined by the cylindrical members 10$e$ and 11$e$, about 0.9 pounds of water are evaporated per second.

By operating the evaporator E–1 under the conditions stated, the fresh water output is approximately 11.7 grams per second, which is removed by the pump means 65 and directed through the conduit means 66 to the oil bath unit 67. Also under these conditions, and in order to maintain the specific gravity of the feed at approximately 1.2, concentrated slurry is removed from the bottom of the evaporator under action of the pump means 63 at a flow rate of approximately 4.3 pounds of slurry per second. Such concentrated slurry illustratively is made up of 3.2 pounds of salt and 1.1 pounds of water.

It should be pointed out that the uppermost steam collection hood 16 serving the twelfth and final reaction zone in the cylindrical member 11k should be positioned as close as convenient to the conduit means 37 which directs the upwardly flowing heat exchange fluid away from the downwardly flowing brine and into the heat exchange column 10. Since no vaporization occurs above the final steam collection hood 16 in the final reaction zone defined by the cylindrical member 10k, the temperature of the heat exchange fluid at the last collection hood is substantially the same as the temperature of the fluid at the point whereat the steam within the hood would normally condense. Since there is no condensation, in the final steam delivery conduit 30 connected to the uppermost steam collection hood, a condenser 29 is advantageously located, so that the product is delivered as water at the temperature of the heat exchange fluid, rather than as steam. In this connection, the incoming brine could be employed to cool the condenser, although if the evaporator unit E–1 was perfectly insulated and the incoming brine and outgoing fresh water were perfectly heat exchanged by the fluid circulating in the auxiliary and upper circulation zone, external water cooling may be necessary to remove heat from the system at the upper end thereof.

The hydrostatic multiple effect evaporator E–1 has been described as preferably employing a heat exchange liquid having a specific gravity between that of the incoming feed and fresh water. In this manner, the maintenance of a balanced hydrostatic head is facilitated, and there is also obtained improved solvent vapor absorption since the vapors are traveling toward reduced temperature zones. However, it may at times be desired to employ as the non-scalable heat exchange medium a fluid which is even less expensive, has a lower water solubility, a higher boiling point or a higher specific heat than the materials used in the evaporator E–1 of FIGURE 1.

A novel structural arrangement for this purpose is illustrated in FIGURE 2, and is designated therein generally by the legend E–2, providing a second form of hydrostatic multiple effect evaporator. While certain structural differences exist between the units of FIGURES 1 and 2, it may be pointed out that one basic distinction is that in FIGURE 2 the heat exchange column 10 of FIGURE 1 is turned upside down so that the condensed vapors flow downwardly and the heat exchange liquid upwardly in this particular column. Since certain like parts from FIGURE 1 have been employed in the structure of FIGURE 2, where applicable like numerals have been employed, raised by an increment of 100.

In common with the arrangement of FIGURE 1, the multiple effect evaporator E–2 has heat exchange columns 100 and 111 formed of cylindrical members 100a–k and 100m and 111a–k and 111m which are sized to provide essentially the same holdup time in each reaction zone defined thereby. The heat exchange liquid used in the evaporator E–2 of FIGURE 2 may illustratively have a specific gravity of 0.995 or less, and may be initially supplied to and replenished in the heat exchange column 111 by an inlet 138. The boiling salt water pool S–1 heated by means 113 may have a temperature of the order of 160° C., and the heat exchange liquid is heated by contacting the boiling body and by absorbing heat released by condensing the last increment of solvent. The relatively highest temperature vapors, which may be at approximately 155° C. are received by conduit means 200, the inlet to which is under control of valve means 201. The steam vapors at about 155° C. are directed through the conduit means 200 under action of turbine means 202 and are discharged at 203 in water trap means 204. The trapped vapors may then be directed through a line 205 into a condensation zone defined by the cylindrical member 100b of the heat exchange column 100.

The vaporization and condensation actions then continue in much the same manner as described in connection with FIGURE 1, and successive increments of steam, and which illustratively may be at a temperature from 150° to 90° C., are directed through conduit means 130 under action of turbine means 208 to like temperature zones in the heat exchange column 100. However, in the interests of clarity of illustration, the conduit means 130 have not been fully shown, although it is of course now understood that the conduit means from the heat exchange column 111 are connected to or communicate with like temperature zones in the heat exchange column 100.

The steam product in the upper and reduced temperature portions of the heat exchange column 111 is likewise directed by conduit means 130 to the lower and reduced temperature portion of the heat exchange column 100 for condensation therein. Water vaporized in the upper stages of the heat exchange column 111 must be compressed, and for this purpose there are shown in the upper several conduit means 130 compressor means 209. The compressor means 209 may be driven by the turbine means 208, or the turbine means may only aid in the driving of the compressors. A vacuum pump V with a condenser CV is, of course, connected to the top of the column 111 (as in the case of the column 11). In such case the column 111 is under vacuum at the top and the column 100 is not, so the level of liquid in the column 111 is correspondingly higher than in column 100 in order to have a balanced hydrostatic head (but for convenience in describing the arrangement E–2 this specific aspect is not shown in FIGURE 2 except for breaks in the connecting lines between the columns 211 and 210 to indicate that they are at separate levels).

As was earlier stated, the heat exchange liquid used in the multiple effect evaporator E–2 of FIGURE 2 has a density less than that of the water product and continuously circulates upwardly in both of the heat exchange columns 100 and 111. An illustrative manner of connection may include conduit means 210 connecting the lower end of the heat exchange column 100 to the top of the heat exchange column 111, as well as conduit means 206 communicating the water trap means 204 with the cylindrical member 111a defining the first reaction zone in the heat exchange column 111. The conduit means 210 may be equipped with pump means 211, and as well, in the conduit means 206 a pump may be utilized.

As may now be appreciated, the steam being absorbed in the heat exchange column 100 rises as it passes into zones of relatively higher temperatures and relatively lower pressures. Accordingly, in the absence of good dispersion and consequent rapid absorption, the steam will rise to the extreme upper end of the column 100. To obviate this problem, at the upper end of the cylindrical member 100a a reflux condenser 215 is located, and sufficient cooling water used therein to maintain good control over the heat exchange column 100.

In other respects the evaporator E–2 is structurally and operationally the same as the evaporator E–1 of FIGURE 1. The water product is removed from the lower end of the heat exchange column 100 under action of pump means 165 which directs the water through an oil bath in the manner of FIGURE 1. Likewise, concentrated slurry is removed from the lower end of the heat exchange column 111 under action of pump means 163.

Two multiple effect evaporators constructed in accordance with the principles of this invention have been shown and described herein and numerous modifications discussed in connection therewith. As for example, the heat recovery columns 10 or 100 can be operated sidewise or horizontally, instead of vertically as shown. In the forms illustrated, the heat exchange liquid is the continuous phase, although it is readily apparent that the brine or other solvent-solute could be the continuous phase in the columns 11 or 111. In any event, in the systems disclosed approximately 90% or more of the water is evaporated from the downwardly flowing solvent-solute before the mixture reaches the bottom of the unit, and it can be seen therefrom that the units described are of a high order of efficiency. The heat exchange fluids described are relatively low in cost, and by utilization of hydrostatic pressure and its effect upon solution boiling point, the pumping requirements are minimized and are only of an amount necessary to overcome frictional losses. By proceeding in the manner described, utilizing the effect of hydrostatic pressure on the boiling point of a solution, the heat released by condensation of the solvent is successively and repeatedly reused, effecting marked economies over systems heretofore proposed. While not absolutely necessary, the heat exchange fluid desirably has a specific gravity between that of the solvent and solvent-solute, facilitating maintaining a balanced pressure head and providing greatly improved solvent vapor absorption since the vapors are traveling toward reduced temperature zones. Twelve stages have been illustrated, although as was earlier pointed out, this number may be widely varied. It is of course appreciated that the illustrative embodiments of the evaporators shown are not drawn to scale, and that changes in dimensions may be made. As for example, it may be desirable to reduce the depth of the pre-heating zone in FIGURE 1 in order to avoid neutralizing the benefits of the vacuum system by imposing too great a pressure on the fluid below. Further, in FIGURE 2 the left column 100 need not be of stepped configuration as shown, but may be of uniform diameter throughout with the same internal volume as the column 111 and with the heat absorption zones therein of constant height. Also, while the drawings are based upon equal holdup time on both sides of the units, this is not necessary.

Referring now to FIGURE 4, which is still another embodiment of the instant invention generally indicated at E–3. It will be seen that the multiple effect evaporator E–3 shown in FIGURE 4 has the evaporating or vaporizing column 311 shown on the left hand side and the condensing column 310 shown on the right hand side. Parts shown in FIGURE 4 which correspond substantially in structure and function to parts shown previously in FIGURES 1 and 2 have the same reference numeral in the 300 series. Thus it will be seen that the vaporizing column 311 corresponds substantially to the vaporizing columns 11 and 111 of FIGURES 1 and 2 in function, although column 311 is shown for convenience merely as a straight cylindrical column. The column 311 is divided into a plurality of chambers 311a through 311j which are composed of superimposed generally cylindrical chambers corresponding essentially in function to those previously shown. The top chamber in the column 311, which is designated 311x is somewhat different in structure than previously shown and will be described in further detail.

In the column 311 the heat exchange fluid or liquid (sometimes referred to as the "oil") is driven or moves upwardly in the manner previously described and the sea water is fed through a line 358, pump 359 and a sparger 347 into the top of the column so that it will move downwardly and the sea water which is not vaporized will ultimately collect in the bottom of the column 311 as a concentrated brine or slurry CB which may be pumped out of the column 311, for example by a submerged pump 350 in a line 351 which preferably moves with the oil and counter-current to the sea water in the manner indicated so that the oil may have an opportunity to pick up as much of the heat of the salt slurry being removed as possible, for better heat efficiency for the whole system.

Also, external heat means 313 of the type already described are provided at the bottom of the column 311 to add heat to the system by vaporizing water from the slurry CB. The volatilization of the water from the sea water in the vaporizing column 311 will, of course, have a cooling effect upon the heat exchange liquid moving upwardly in the column 311, and this heat exchange liquid will thus continuously decrease in pressure and temperature in its direction of flow in the column 311.

It will be noted that at the top of the condensing column 311 there is provided a vacuum pump 352 with a condenser 353 which communicates with the top of the evaporating column 311 by way of a header 354, so that the pressure is maintained at a minimum in the top chamber or compartment 311x in the column 311. Because of the hydraulic head of the liquid, however, the pressure increases downwardly in the column 311 to obtain superatmospheric pressures at the bottom thereof, in the manner already described.

The sea water thus being fed into the top of the column 311 flows directly in contact with and counter-current to the heat exchange liquid or oil so that the sea water passes through the vertically aligned areas or chambers 311j to 311a so as to be subjected to continuously increasing temperatures and pressures, at which the water from the salt water undergoes evaporation continuously. Water vapor hoods 316a, 316b, etc. are vertically spaced at predetermined distances apart in the column 311 and increments of water vapor are collected in each of these hoods in the manner previously described. The increments of water vapor are at increasing temperatures and pressures in the direction of flow of the sea water i.e. the downward direction; and the increments of water vapor are drawn off from the hoods 316a, 316b, etc. through lines which in FIGURE 4 are designated by the temperatures of the water vapor or steam therein (which reading from the top down are 40° C., 50° C., 60° C., 70° C., etc.).

The heat exchange liquid or oil is driven through a cycle which comprises the upwardly moving stream in the column 311 and a downwardly moving stream in the column 310. The liquid is driven in this cycle by suitable means such as a pump 355 in a line 356 just below the liquid level at the top of the two columns 311 and 310. At the top of the column 311, the heat exchange liquid or oil has reached its lowest temperature by virtue of direct heat exchange with the sea water added thereto in the column 311 and in this condition it flows into the top of the condensing column 310 and downwardly. The water vapor or steam which has been generated in the lines designated by the temperatures 40° C., 50° C., 60° C., etc is introduced into the downwardly directed stream of heat exchange liquid in the column 310 by suitable means such as spargers 331a, 331b, 331c, etc. (designated from bottom to top) in the superimposed generally cylindrical chambers 310a, 310b, 310c through 310j.

In the downwardly flowing region of the liquid stream in the column 310, the liquid stream undergoes continuous increases in pressure and in temperature. Steam having the lowest temperature and pressure (e.g. about 40° C.) is introduced into the top chamber 310j whereat the incoming heat exchange liquid is coolest; and steam having the highest temperature and pressure (e.g. 130° C.) is introduced into the bottom chamber 310a to impart to the heat exchange liquid leaving the bottom of the column 310 the highest possible temperature in the system so that it may pass through the connecting header 357 at the bottom of the columns 311 and 310 into the upwardly flowing heat exchange liquid stream in the column 311.

For reasons already discussed herein, it is desirable to maintain a minimum pressure at the top of the columns 311 and 310 and this is done by means of a conventional vacuum pump 352. The vacuum pump is equipped with a condenser 353, since there will be a tendency for some appreciable quantities of water vapor, and some oil vapor to accumulate at the top of the columns and otherwise be drawn off through the vacuum pump. These are instead condensed in the condenser 352 and collected in the separation chamber 360 directly beneath the condenser. In the separation chamber the water is separated from the oil and drawn off as product through the line 361, which is maintained in a position to hold the level L in the chamber 360.

Since the liquid level in the two columns 311 and 310 is maintained substantially the same, the pressure is also substantially the same in the two columns at any given depth. For example, the pressure of the steam collected in the hood 316b (at a temperature of 120° C.) is substantially the same as the pressure in the column 311 at the sparger 331b. The sparger 311b is, of course, positioned slightly above the hood 316b, so that the steam will have sufficient pressure to go through the sparger 331b and into the heat exchange liquid in the column 310. By introducing the increments of steam having a given temperature and pressure into the downwardly directed stream of liquid in the column 310 at substantially the same pressure in the downwardly directed stream, however, it will be noted that one introduces the hottest steam (e.g. 130° C.) at the sparger 331a closest to the exit 357 from the bottom of the column 310.

Since the water condensate in the column 310 is actually heavier than the light oil used in this embodiment, it will be appreciated that the initial counter-current flow of water vapor upwardly in the column 310 is actually reversed at the time condensation takes place and the water droplets fall downwardly in the column. The water droplets are preferably collected in a plurality of vertically spaced trays, here indicated at 371, 372 and 373 and a bottom tray or pan 374. Each tray 371–374 is equipped with suitable pump means such as a submerged pump 371a through 374a. And each of these pumps drives the condensate through lines 371b–374b here shown for simplicity only diagrammatically along the column wall, upwardly in counter-current flow to the downwardly flowing liquid stream, for purposes of additional heat exchange. The lines 371b–374b may actually flow upwardly in spirals or other configuration so as to obtain the best heat exchange with the downwardly flowing heat exchange liquid. In this way, the minimum amount of heat is taken from the overall system by removal of the condensate product. It will also be appreciated that the condensate lines 371b–374b could even be directed upwardly in the column 311 for heat exchange purposes, although it is preferable to retain these lines in the column 310. The lines 371b–374b ultimately feed into the product header A.

Referring now to the details of FIGURE 5, it will be seen that the side walls of the column 310 are represented by the reference numerals 410 and 410a in this embodiment and a sparger 431 is shown feeding steam directly into the downwardly flowing column of heat exchange liquid. In addition, a plurality of relatively fine mesh (40–50 mesh) copper screens 432a, 432b, 432c extend across the interior of the column 410–410a and each is tilted downwardly slightly toward water traps respectively for 433a, 433b, and 433c. At the upwardly tilted end of each screen 432a, 432b, 432c, a small space is provided (indicated by the curved arrow) for excess bubbles of steam to pass beyond the screen. In this way, steam which does not condense immediately upon entrance into the heat exchange liquid will tend to be driven in a zig-zag course and will thus be ultimately condensed before it has an opportunity to escape upwardly any great distance. The copper screen will prevent the downward flow of droplets of water while permitting the downward flow of the heat exchange liquid, such as oil. The droplets of water will, instead, be deflected by each of the copper screens into the respective water trap.

The arrangement of FIGURE 5 affords a number of advantages in that it minimizes convection currents in the liquid column and it affords an extreemly convenient means for collecting water droplets without substantially interfering with the flow of the heat exchange liquid in the column.

The embodiment of FIGURE 4 provides certain advantages. First of all, the problems of variations in density between the water, brine and heat exchange liquid are simplified and there is no need to recirculate slurry or feed to adjust the specific gravity of the feed. In addition, light oils are usually more readily available and at lower cost. The light oils do not present significant problems in connection with high viscosity, high solubility in water or chemical or thermal stability.

It will be appreciated that in the practice of the instant invention the material hereinbefore referred to as the solute is ordinarily a material that in its free or normal state is solid. This material need not be in the solvent in true solution and it may merely be dispersed therein, as in the case of clays or algae or other matter which may be found in impure river water, for example. The instant invention affords particular advantages in the purification of sea water, but even sea water does not have all matter therein in true solution.

On the other hand, it will be appreciated that the invention may also be used in the separation of a solvent from a solution of other than normally solid material such as in the case of concentration of spent or dilute sulfuric acid, which could be carried out readily in the process described herein in connection with FIGURE 4. The spent sulfuric acid could be added (in place of the salt water) to a stream of paraffinic oil (B.P. 200–300° C., sp. gr. 0.8) and the water thus evaporated from the acid would produce a useful more concentrated sulfuric acid product (in place of the slurry CB). The sulfuric acid may thus be concentrated from 30% spent acid up to as high as 90% concentrated acid. Also preferred as a heat exchange liquid in this process is paraffin distillate (B.P. 300–350° cut). Glycerin (B.P. 290° C.) is concentrated in like manner.

The light oil used in the embodiment E–3 (as well as E–2) for the production of fresh water from salt water is a paraffinic petroleum oil cut (B.P. 200–300° C., sp. gr. 0.8). Also distilled kerosene (B.P. 200–270° C.) is used as the heat exchange liquid in place of such paraffinic oil in E–2 and E–3; but other light oils may be used in the practice of the instant invention such as heater oil, heavy naphthas, spray base oil, Stoddard Solvent, and other petroleum distillates having specific gravities between 0.75 and 0.85. Humble Oil solvent Varsol 2 has an initial boiling point of 164° C. and a final boiling point of 200° C. (sp. gr. 0.807 and viscosity 0.939 centipoises at 25° C.) and this may also be used. Kerosene has an initial B.P. of 163° C., 50% off at 207° C., and final B.P. of 270° C. (sp. gr. 0.797), and since it is usually desirable to have as much difference in B.P. between the heat exchange liquid and the material (e.g. water) being evaporated, a kerosene cut of about 200–270° C. may be prepared. No. 1 Heater Oil has 10% B.P. of 210° C., 50% of 221° C., 90% of 271° C. and a final B.P. of 293° C. (sp. gr. 0.827).

Referring now to FIGURE 6 it will be seen that there is shown still another embodiment of multiple effect evaporator designated generally E–4, wherein parts that are the same as those already described are designated by the same reference numeral in the 400 series, and for convenience the use of the embodiment E–4 will also be described for the purposes of obtaining fresh water from salt water, but in this case using tetrachloroethane as the specific heat exchange liquid for this particular example. In this example, the tetrachloroethane is heavier than the fresh water condensate and also heavier than the concentrated brine which collects.

It will thus be seen that in the embodiment E–4 there are shown an evaporating column 411 in the lefthand side and a condensing column 410 in the righthand side that compare in structure to the previously described columns 311 and 310. For example, column 411 is divided into a plurality of chambers 411a through 411j plus a top chamber 411x (which is comparable in structure to the previously described chamber 311x). In one use of the column 411, however, the heavy oil is fed into the bottom of the column through a line 457 and it rises to the top of the column and is drawn off through a line 456 via a pump 455 so that it enters the top of the column 410 and passes downwardly therein to be withdrawn therefrom through the bottom line 457. In this arrangement, the salt water is fed into the column 411 under pressure via a pump 480 in the line 481 and it enters the column 411 through a sparger 482. Heat is also added to the column by the heater 413 at the bottom thereof, in the manner previously described, but in this arrangement the salt water, being lighter than the oil rises upwardly and the unevaporated concentrate CB rises to the top of the liquid in column 411, forming a layer CB on top of the oil. This layer of concentrated brine is withdrawn through a line 483 via a pump 484.

Since the concentration of the salt water results in salt crystals actually precipitating out of the aqueous system (and such salt particles are heavier than the oil), there is a tendency for some salt particles to collect at the bottom of the evaporating column 411 and these are purged periodically from the bottom of the column 411 via a slurry pump 485 through a dump line 486.

In the column 411 the heat exchange liquid or oil is under its maximum pressure and at its maximum temperature in the chamber 411a (with heat being added thereto by the external heater 413) and the salt water added through the sparger 482 in the chamber 411a will immediately lose some of its water by evaporation, so that steam under maximum pressure and at a maximum temperature in this arrangement is formed and collected in the first hood 416a, and this steam is transferred via the line 417a to a sparger 431a in the downwardly flowing stream of heat exchange oil in the condensing column 410. This results in the condensation of steam at the highest temperature in the system in the heat exchange liquid just before it enters into the bottom of the column 411 through the line 457 which is, of course, desirable. It will also be appreciated that the sparger 431a is positioned at approximately (but slightly above) the level of the hood 416a, so that the steam is transferred under pressure through the line 417a and escapes into the heat exchange liquid in the column 410 at a pressure in the heat exchange liquid that is substantially the same as (but just slightly less than) the pressure of the steam. The steam being emitted from the sparger 431a is condensed and the droplets of condensate which are then quite warm flow upwardly in counter-current flow to the heat exchange liquid and collect in a layer C at the top of the column 410. This counter-current flow of condensate effects a better retention of the total heat in the system, so that the condensate removed in the product header 487 via the pump 488 is comparatively cool. The heat exchange oil in the system is maintained so as to have substantially the same level in both of the columns 411 and 410. Preferably, also, the tops of the columns 411 and 410 are maintained under vacuum by means of a vacuum pump 489 functioning in combination with a condenser 490 which will condense out water vapor tending to escape and permit the same to run back into the layer of condensate C.

As the salt water rises in the evaporator column 411 from the feed sparger 482, water is continuously evaporated therefrom at successively lower temperatures, but also at successively lower pressures and collected in the hoods 416b, 416c, 416d, etc, so that in the top hood 416j, the water vapor at a minimum temperature and minimum pressure for this system is formed and collected. This water vapor is transferred through the top line 417j into the top sparger 431j at the top of the column 410. At this stage the heat exchange oil will be only slightly cooler than it was when it passed the hood 416j in the evaporator column 411, so that there may be a tendency for some of the steam escaping from the sparger 431j to fail to condense in the surrounding heat exchange oil. Such steam may be condensed to a substantial extent as it enters into the layer of condensate C on top of the oil and, any steam escaping further will be condensed in the condenser 490 just ahead of the vacuum pump 489, so that the additional cooling that may be necessary to operate the top compartment of the column 410 is provided by the condenser 490. The intermediate spargers 431b through 431i will, of course, function to introduce steam at intermediate pressures and temperatures into the body of the heat exchange liquid in the column 411 in the manner hereinbefore described. A possible major use for these methods would be in concentrating solutions used to remove moisture from air, natural gas, and other gases. Materials which can be used in this way are sulfuric acid, ethylene glycol, diethylene glycol, triethylene glycol, and solutions of salts such as calcium chloride, lithium chloride, and other hygroscopic salts. A paraffinic oil would be the preferred heat exchange medium in such use.

It will be understood that modifications and variations may be effected without departing from the spirit and scope of the novel concepts of the present invention.

I claim as my invention:

1. A method of separating a substantially pure liquid solvent (a) from a solution (b) of an impurity (c) in said solvent (a), using a heat exchange fluid (d) which has an effectively different specific gravity from that of said solvent (a) and of said solution (b) and with which said solvent (a), solution (b) and impurity (c) are respectively mutually substantially insoluble, said method being carried out with the direct contact exchange of heat between said heat exchange liquid (d) and said solution (b) and solvent (a) and said method comprising the following steps:

(1) flowing said heat exchange liquid (d) upwardly in a heated state through a vertically disposed first hydraulic column constituting an evaporation region of continuously increasing temperature and pressure downwardly and then through a vertically disposed second hydraulic column constituting a condensation region also of downwardly increasing temperature and pressure, the direction of flow through said condensation region being predetermined independently of whether the specific gravity of the heat exchange liquid (d) is greater or less than that of the solution (b) and of the solvent (a);
   (2) flowing said solution (b) through said evaporation region in direct contact with said heat exchange liquid at a temperature sufficient to effect volatilization of said solvent at a sequence of levels of varying temperature and pressure to produce a sequence of separate and distinct increments of solvent vapor of sequentially changing temperature and pressure;
   (3) effecting the transfer of said increments of solvent vapor into said condensation region at sequential levels therein of comparable pressure to effect condensation of said vapor and transfer of heat of condensation directly to said heat exchange liquid while at a lower temperature in contact with said respective increments;
   (4) separating the resulting condensate from said heat exchange liquid; and
   (5) adding the necessary amount of heat to said heat exchange liquid (d) to effect the volatilization of said solvent as aforesaid.

2. A method of separating a substantially pure liquid solvent from a mixture of solvent-solute comprising a solvent (a) containing in its impure form (b) an intimately dispersed impurity (c) which imparts to said impure form (b) a specific gravity that is different from that of the solvent in its pure form (a), such method involving direct contact heat exchange by the use of a heat-exchange liquid (d) which is substantially mutually insoluble with the solvent both in its pure form (a) and its impure form (b) and with said impurity (c) and which has a specific gravity effectively different from that of the solvent in each of its forms (a and b), said method consisting essentially of:

(1) driving the heat-exchange liquid (d) in a heated state upwardly through a vertically disposed hydraulic column constituting an evaporation region of continuously downwardly increasing temperature and pressure and then downwardly through a vertically disposed second hydraulic column constituting a condensation region of continuously increasing temperature and pressure;

(2) introducing said impure form (b) into said evaporation region to flow downwardly therein in direct contact with said heat exchange liquid (d) at sequential levels of temperature and pressure whereby the heat exchange liquid (d) in said evaporation region creates a sequence of separate and distinct increments of volatilized substantially pure solvent (a), such increments in said evaporation region consisting of solvent vapor having successively increased temperature and pressure;

(3) introducing the aforesaid increments into said condensation region at locations therein having respectively such temperature and pressure conditions as to effect condensation of said respective increments;

(4) causing such condensed increments of substantially pure solvent (a) to flow out of said condensation region to be separated thereby from such heat exchange liquid (d); and (5) adding heat to the heat exchange liquid (d) near the bottom of the evaporation region to provide sufficient heat for the vaporization and volatilization of said increments.

3. The method as defined by claim 1, wherein,
the solution (b) is a saline water and the impurity (c) is salt,
the heat exchange liquid (d) has a specific gravity greater than the saline water and therefore greater than pure water and the direction of flow of the heat exchange liquid (d) is upwardly in said evaporation region and downwardly in said condensation region and counter to the direction of flow of said saline water and of said condensate in said evaporation and condensation regions respectively.

4. The method as defined by claim 1, wherein,
said impurity (c) is salt and said solvent (a) is water, said heat exchange liquid has a specific gravity less than that of both salt water (b) and pure water (a), the direction of flow of said heat exchange liquid (d) is upward in both said evaporation and said condensation regions, and counter current to said salt water and said condensate in said evaporation and condensation regions respectively.

5. The method as defined by claim 1, wherein,
said pure liquid solvent (a) is pure water, said solution (b) is ocean water and said impurity (c) is salt,
said heat exchange liquid (d) has a lower specific gravity than that of said condensate (a) and the direction of flow of said heat exchange liquid (d) is upwardly in said evaporation region counter current to said solution (b) and is downwardly in said condensation region in contact with said condensate (a).

6. The method as defined by claim 1, wherein,
said pure liquid solvent (a) is pure water, said solution (b) is ocean water and said impurity (c) is salt,
said heat exchange liquid (d) has a higher specific gravity than that of both of said solvent (a) and said solution (b), the direction of flow of said heat exchange liquid is upward in said evaporation zone and downward in said condensation zone, and the direction of said solution (b) and of said condensate (a) is upward in said evaporation and condensation zones respectively.

7. The method of claim 1, wherein said heat exchange liquid (d) is a liquid hydrocarbon.

8. The method of claim 5, wherein said heat exchange liquid (d) is a liquid hydrocarbon.

References Cited by the Examiner
UNITED STATES PATENTS

| | | | |
|---|---|---|---|
| 1,547,893 | 7/1925 | Bergius | 202—74 |
| 2,759,882 | 8/1956 | Worthen et al. | 202—53 X |
| 2,976,224 | 3/1961 | Giliand | 202—74 |

FOREIGN PATENTS

| | | |
|---|---|---|
| 479,954 | 3/1925 | Germany. |
| 176,499 | 3/1922 | Great Britain. |

OTHER REFERENCES

"Chemical Engineering," October 1956, pages 126, 128, 130, 132, and 134.

NORMAN YUDKOFF, *Primary Examiner.*

ALPHONSO D. SULLIVAN, *Examiner.*